Aug. 11, 1925.

W. C. McLAUGHLIN 1,549,592

DISK PLOW SCRAPER

Filed Jan. 18, 1923

Inventor
W. C. McLaughlin,

By  Etienne Talbert
Attorney

Patented Aug. 11, 1925.

1,549,592

UNITED STATES PATENT OFFICE.

WALTER C. McLAUGHLIN, OF DENTON, MONTANA.

DISK-PLOW SCRAPER.

Application filed January 18, 1923. Serial No. 613,421.

*To all whom it may concern:*

Be it known that WALTER C. McLAUGHLIN, a citizen of the United States of America, residing at Denton, in the county of Fergus and State of Montana, has invented new and useful Improvements in Disk-Plow Scrapers, of which the following is a specification.

The object of the invention is to provide an efficient means for use in connection with disk plows for cleaning the same as they operate or in other words for preventing the adherence of soil to the surfaces thereof and therefore maintaining the plow disk in proper working condition regardless of the adhesive quality of the soil in which it may be operated; and furthermore to provide a device for the purpose indicated which may readily be applied to the plow disks without involving the necessity of any alteration in the construction or mounting of the latter; and with these objects in view the invention consists in a construction and combination of parts of which a preferred embodiment is shown in the accompanying drawings, wherein:—

Figure 1:
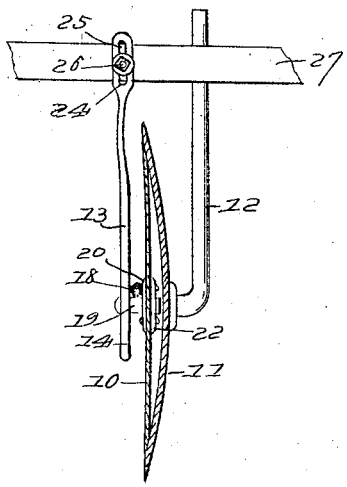
Figure 1 is a sectional view of a disk plow cleaner constructed and mounted in accordance with the invention and applied in the operative position to a plow of the type for which it is designed.
Figure 2:
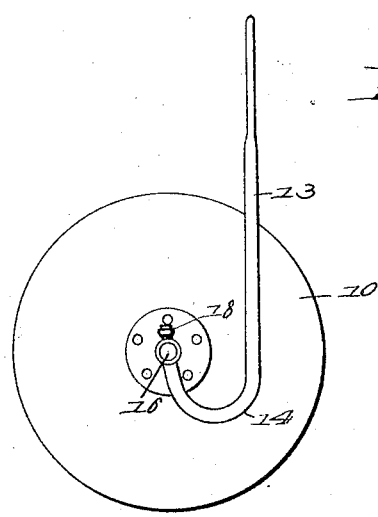
Figure 2 is a side view of the same.
Figure 3:
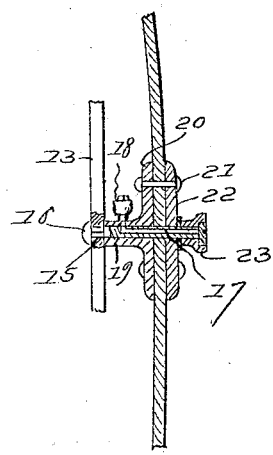
Figure 3 is an enlarged sectional view of the mounting of the cleaner disk.

The device embodying the invention consists essentially of a cleaner disk 10 which is shown in Figure 1 in operative relation with a plow disk 11 of conventional type carried by the usual standard 12, the cleaner disk being of slightly dished form as shown and being of a diameter slightly less than that of the plow disk and having a reduced or beveled edge which lies in contact with the concaved face of the plow disk adjacent to its periphery.

The mounting of the cleaner disk is preferably such as to permit of its rotation with the plow disk or independently thereof so that in practice there is a slight creeping action or relative movement of the cleaner and plow disks which not only maintain a proper operative relation of the periphery of the cleaner disk with the surface of the plow disk, but aids in detaching any soil which may adhere and insuring a clean surface of the plow disk.

The cleaner disk is supported by a hanger bar 13 preferably having a looped lower end as indicated at 14 with its extremity provided with an opening 15 through which extends a bolt 16. This bolt which is preferably provided with an oil or grease duct 17 fed by a conventional grease cup 18 extends through a sleeve 19 carried by a plate 20 secured to the outer or concaved side of the cleaner disk while attached to the convexed surface of said disk, preferably by common rivets 21 which extend through the cleaner disk and the plate 20, is a plate 22 forming a bearing for a nut 23 which is threaded on the inner end of the bolt 16 and which serves as the means of holding the cleaner disk in its proper relation to the plow disk while permitting rotary movement thereof. The hanger bar 13 is preferably flattened at 24 and slotted as indicated at 25 for engagement by a bolt 26 by which it is secured to a member 27 of the plow frame.

Having described the invention, what is claimed as new and useful is:—

1. A disk plow cleaner having a disk arranged in contact with the surface of the concaved side of the plow disk near the edge and supported independently thereof and in co-axial relation therewith.

2. A disk plow cleaner having a disk arranged in contact with the surface of the concaved side of the plow disk near the edge in co-axial relation with the plow disk and with its periphery in parallelism with that of the plow disk and adjacent thereto.

In testimony whereof he affixes his signature.

WALTER C. McLAUGHLIN.